W. GORDON.
Improvement in Water-Closet Valves.
No. 132,654. Patented Oct. 29, 1872.
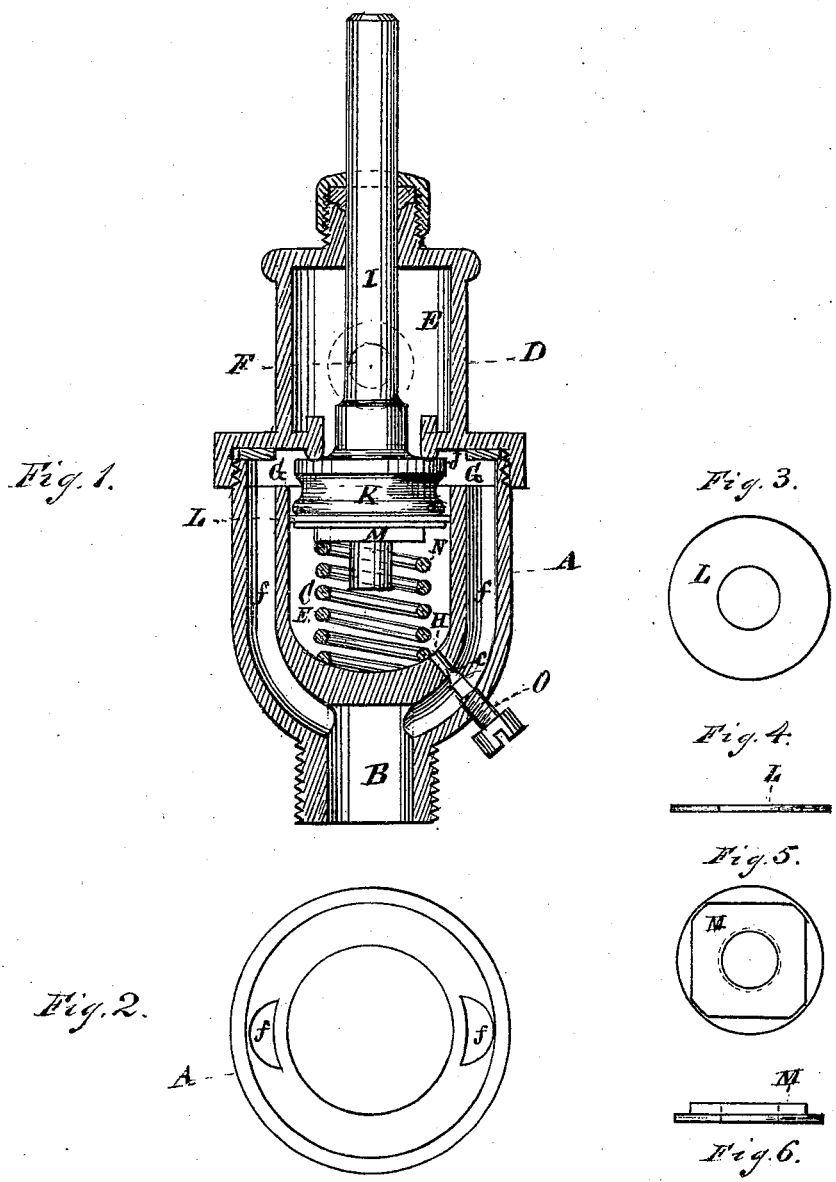

UNITED STATES PATENT OFFICE.

WILLIAM GORDON, OF PHILADELPHIA, PENNSYLVANIA, ASSIGNOR OF ONE-HALF HIS RIGHT TO ANDREW McCAMBRIDGE, OF SAME PLACE.

IMPROVEMENT IN WATER-CLOSET VALVES.

Specification forming part of Letters Patent No. 132,654, dated October 29, 1872.

*To all whom it may concern:*

Be it known that I, WILLIAM GORDON, of the city of Philadelphia and State of Pennsylvania, have invented certain Improvements in Water-Closet Valves, of which the following is a specification:

The first part of my invention relates to the combination of two or more water-passages with the inlet-opening and with an enlargement of the valve-chamber, to cause the water to spread out and around the valve freely to equalize the pressure on each side of the same, as hereinafter fully described. The second part of the invention relates to the combination of an elastic washer on the lower side of the valve, with the valve-chamber and with an induction water-passage, so as to cause a certain amount of water to pass into the valve-chamber behind the valve, the said induction-passage being provided with an adjustable screw, which has a conical end for regulating the flow of water to cause a quick or slow movement of the valve.

Figure 1 is a vertical section of the improved valve. Fig. 2 is a plan view of the inlet section A, the outlet section being removed. Figs. 3 and 4 are a face and edge views of the washer L. Figs. 5 and 6 are like views of the flanged nut M.

Like letters in all the figures indicate the same parts.

A is the inlet section of the valve, having an induction-opening, B, and valve-chamber C. D is the outlet section, connected with the inlet section by male and female screws, as seen in Fig. 1. There is an enlargement, G, of the valve-chamber C, into which the water passes through two or more vertical passages, *f f*, which branch out from the induction-opening B, whereby it is caused to flow freely around the valve J to equalize the pressure on both sides thereof. I is the valve-stem, and J the valve. Against the lower side of the valve-head K is an elastic washer, L, a trifle larger in diameter than the valve. The washer is of sufficient distance from the valve to remain in the valve-chamber when the latter has passed out of the same, and is against its seat, as seen in Fig. 1. The lower corner *a* of the head K is rounded off, as seen in Fig. 1, to allow the washer L to turn up in the downward motion of the valve to allow the water remaining behind the washer to pass up into the distributing-chamber. The washer is held in place by a flanged nut, M, the flange being nearly as large in diameter as the washer so as to prevent the latter being bent backward in the chamber by the pressure of the water. The valve-stem is seated on the spring N, the lower side of the flanged nut M resting upon the same. As the water passes up and out of the valve-chamber C from behind the washer L, escaping around the turned-up edge of said washer in each downward movement of the valve, a provision is made for a new supply of water simultaneously with the outflow from the valve-chamber. Without such provision a vacuum would be formed behind the valve and the spring N would not have sufficient power to return the valve to its seat. This supply of water is kept up through the passage P, leading from one of the side openings *f* into the valve-chamber. The flow of water through this passage is regulated by means of the adjustable screw O, which has a conical point, *e*, which, by being advanced toward its seat, decreases the flow, or being withdrawn therefrom increases it, whereby a slow or quick motion is given to the valve, as may be desired.

I claim as my invention—

1. The combination of the passages *f f* with the inlet-opening B and enlargement G of the valve-chamber C to cause the water to spread out and flow freely around the valve J to equalize the pressure on both sides of the same, substantially as described.

2. The combination and arrangement of the flat elastic washer L with the valve J, the valve-chamber C, and passage *f*, provided with an adjustable valve-screw, O, for regulating the movement of the valve, substantially as set forth.

WILLIAM GORDON.

Witnesses:
STEPHEN USTICK,
THOMAS J. BEWLEY.